(12) United States Patent
Messina et al.

(10) Patent No.: US 9,174,686 B1
(45) Date of Patent: Nov. 3, 2015

(54) MILITARY VEHICLE

(71) Applicant: Oshkosh Corporation, Oshkosh, WI (US)

(72) Inventors: Rob Messina, Oshkosh, WI (US); Chris Yakes, Oshkosh, WI (US); Dave Marek, Oshkosh, WI (US); Colin Wheeler, Oshkosh, WI (US); Joseph Holda, Oshkosh, WI (US); Dean Seefeldt, Oshkosh, WI (US); Ben Andrews, Oshkosh, WI (US); Martin Schimke, Oshkosh, WI (US); Steve Tittl, Oshkosh, WI (US); Austin Dowdy, Oshkosh, WI (US); Kevin Pennau, Oshkosh, WI (US); Greg Malcolm, Oshkosh, WI (US); Andrew Drach, Oshkosh, WI (US); Andy McClaine, Oshkosh, WI (US); Ryan Carignan, Oshkosh, WI (US); Erik S. Ellifson, Oshkosh, WI (US); Aaron Rositch, Oshkosh, WI (US)

(73) Assignee: Oshkosh Defense, LLC, Oshkosh, WI (US)

( * ) Notice: Subject to any disclaimer, the term of this patent is extended or adjusted under 35 U.S.C. 154(b) by 135 days.

(21) Appl. No.: 13/774,781

(22) Filed: Feb. 22, 2013

Related U.S. Application Data

(60) Provisional application No. 61/601,897, filed on Feb. 22, 2012.

(51) Int. Cl.
*B62D 33/06* (2006.01)

(52) U.S. Cl.
CPC ..................................... *B62D 33/06* (2013.01)

(58) Field of Classification Search
USPC ........................................ 296/84.1, 96.21, 64
See application file for complete search history.

(56) References Cited

U.S. PATENT DOCUMENTS

| | | | | |
|---|---|---|---|---|
| 2,839,312 | A | * | 6/1958 | Barenyi et al. ................. 280/775 |
| 3,694,025 | A | * | 9/1972 | Buehrig ........................... 296/64 |
| 4,823,142 | A | * | 4/1989 | Ohe et al. ........................ 343/713 |
| 5,538,274 | A | | 7/1996 | Schmitz et al. |
| 5,697,741 | A | | 12/1997 | Harris et al. |
| 5,820,150 | A | | 10/1998 | Archer et al. |
| 6,105,984 | A | | 8/2000 | Schmitz et al. |
| 6,485,079 | B1 | | 11/2002 | Brown et al. |
| 6,516,914 | B1 | | 2/2003 | Andersen et al. |
| 6,520,494 | B1 | | 2/2003 | Andersen et al. |
| 6,561,718 | B1 | | 5/2003 | Archer et al. |
| 6,666,491 | B2 | | 12/2003 | Schrafel |

(Continued)

OTHER PUBLICATIONS

U.S. Appl. No. 13/628,844, filed Sep. 27, 2012, Oshkosh Corporation.

(Continued)

*Primary Examiner* — Joseph D Pape
(74) *Attorney, Agent, or Firm* — Foley & Lardner LLP

(57) ABSTRACT

A vehicle includes a chassis having a longitudinal centerline, a first axle and a second axle coupled to the chassis, a cab, a driver's seat, and a passenger seat. The cab is coupled to the chassis and includes a windshield assembly comprising a first side portion, a middle portion, a second side portion, a first pillar coupling the first side portion to the middle portion, and a second pillar coupling the second side portion to the middle portion. The driver's seat is disposed within the cab along the longitudinal centerline, and the passenger seat is disposed within the cab and longitudinally offset from the driver's seat to improve driver visibility.

11 Claims, 21 Drawing Sheets

(56) References Cited

U.S. PATENT DOCUMENTS

| | | | |
|---|---|---|---|
| 6,918,721 B2 | 7/2005 | Venton-Walters et al. | |
| 6,997,506 B2 | 2/2006 | Hecker | |
| 7,055,880 B2 | 6/2006 | Archer | |
| 7,073,620 B2 | 7/2006 | Braun et al. | |
| 7,073,847 B2 | 7/2006 | Morrow et al. | |
| 7,118,314 B2 | 10/2006 | Zhou et al. | |
| 7,198,130 B2 | 4/2007 | Schimke | |
| 7,258,194 B2 | 8/2007 | Braun et al. | |
| 7,264,305 B2 | 9/2007 | Kuriakose | |
| 7,357,203 B2 | 4/2008 | Morrow et al. | |
| 7,370,904 B2 | 5/2008 | Wood et al. | |
| 7,448,460 B2 | 11/2008 | Morrow et al. | |
| 7,517,005 B2 | 4/2009 | Kuriakose | |
| 7,520,354 B2 | 4/2009 | Morrow et al. | |
| 7,621,580 B2 | 11/2009 | Randjelovic et al. | |
| 7,641,269 B2 * | 1/2010 | Matsumoto et al. | 296/203.01 |
| 7,823,948 B2 | 11/2010 | Redman et al. | |
| 7,824,293 B2 | 11/2010 | Schimke | |
| 7,931,103 B2 | 4/2011 | Morrow et al. | |
| 7,954,882 B2 | 6/2011 | Brummel et al. | |
| 8,123,645 B2 | 2/2012 | Schimke | |
| 8,139,109 B2 | 3/2012 | Schmiedel et al. | |
| 8,152,216 B2 | 4/2012 | Howell | |
| 8,333,390 B2 | 12/2012 | Linsmeier et al. | |
| 8,376,439 B2 | 2/2013 | Kuriakose et al. | |
| 8,459,619 B2 | 6/2013 | Trinh et al. | |
| 8,465,025 B2 | 6/2013 | Venton-Walters et al. | |
| 8,561,735 B2 | 10/2013 | Morrow et al. | |
| 8,596,648 B2 | 12/2013 | Venton-Walters et al. | |
| 8,764,029 B2 | 7/2014 | Venton-Walters et al. | |
| 8,794,886 B1 | 8/2014 | Nett et al. | |
| 8,801,017 B2 | 8/2014 | Ellifson et al. | |
| 8,821,130 B2 | 9/2014 | Venton-Walters et al. | |
| 8,876,133 B2 | 11/2014 | Ellifson | |
| 2007/0088469 A1 | 4/2007 | Schmiedel et al. | |
| 2009/0079839 A1 | 3/2009 | Fischer et al. | |
| 2009/0194347 A1 | 8/2009 | Morrow et al. | |
| 2012/0143430 A1 | 6/2012 | Broggi et al. | |
| 2012/0234638 A1 | 9/2012 | Ellifson et al. | |
| 2014/0131969 A1 | 5/2014 | Rowe et al. | |
| 2014/0251742 A1 | 9/2014 | Dillman et al. | |
| 2014/0255136 A1 | 9/2014 | Malcolm et al. | |
| 2014/0291945 A1 | 10/2014 | Venton-Walters et al. | |

OTHER PUBLICATIONS

U.S. Appl. No. 13/841,686, filed Mar. 15, 2013, Oshkosh Corporation.
U.S. Appl. No. 14/334,305, filed Jul. 17, 2014, Oshkosh Corporation.
U.S. Appl. No. 14/341,489, filed Jul. 25, 2014, Oshkosh Corporation.
U.S. Appl. No. 14/515,199, filed Oct. 23, 2014, Oshkosh Corporation.
HDT Storm SRTV Light Tactical All-Terrain Vehicle Product Information Sheet, HDT Global, available at least as early as Feb. 28, 2013, 2 pages.

* cited by examiner

MILITARY VEHICLE

CROSS-REFERENCE TO RELATED PATENT APPLICATIONS

This application claims the benefit of U.S. Provisional Patent Application No. 61/601,897, filed Feb. 22, 2012, which is incorporated herein by reference in its entirety.

BACKGROUND

The present application relates to vehicles. In particular, the present application relates to systems that improve driver visibility and storage on a vehicle.

A military vehicle may be used in a variety of applications and conditions. These vehicles generally include a number of vehicle systems or components (e.g., a cab or body, a drive train, etc.). The military vehicle may also include various features and systems as needed for the specific application of the vehicle (e.g., a hatch, a gun ring, an antenna, etc.). Proper functioning and arrangement of the vehicle systems or components is important for the proper functioning of the vehicle.

Traditional vehicles include a cab assembly coupled to a chassis and including several seats (e.g., for a driver, for a passenger, etc.). These seats are commonly configured in a side-by-side arrangement where the driver and at least one passenger are located at the same location along the length of the military vehicle. In such a configuration, the passenger and portions of the cab assembly may reduce the visibility of the driver.

SUMMARY

One embodiment of the invention relates to a military vehicle including a chassis defining a longitudinal centerline, a first axle and a second axle coupled to the chassis, a cab, a driver's seat, and a passenger seat. The cab is coupled to the chassis and includes a windshield assembly comprising a first side portion, a middle portion, a second side portion, a first pillar coupling the first side portion to the middle portion, and a second pillar coupling the second side portion to the middle portion. The driver's seat is disposed within the cab along the longitudinal centerline, and the passenger seat is disposed within the cab and longitudinally offset from the driver's seat to improve driver visibility.

Another embodiment of the invention relates to a vehicle that includes a cab assembly having a driver's seat positioned along a centerline of the vehicle and defining a front end and a back end. The military vehicle also includes a front axle coupled to the front end of the cab assembly, a rear axle coupled to the back end of the cab assembly, a body panel assembly coupled to the front end of the cab assembly and partially surrounding the front axle, and an interchangeable module. The interchangeable module partially surrounds the rear axle and is removably coupled to the back end of the cab assembly with a plurality of exposed interfaces. The plurality of exposed interfaces are positioned to facilitate the efficient removal of the interchangeable module from the vehicle.

Still another embodiment of the invention relates to a vehicle including a cab assembly having a driver's seat positioned along a centerline of the vehicle, an axle coupled to a front end of the cab assembly, and a body panel assembly. The body panel assembly is coupled to the end of the cab assembly and includes a panel section that partially surrounds the axle, wherein the panel section defines an open depression that receives a container and provides additional storage for the vehicle.

The invention is capable of other embodiments and of being carried out in various ways. Alternative exemplary embodiments relate to other features and combinations of features as may be recited in the claims.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring to the exemplary embodiments shown in FIGS. 1-21, a vehicle, shown as military vehicle 10, includes various features and configurations or systems that allow the military vehicle 10 to have enhanced performance. According to an exemplary embodiment, such features include a modular rear section of the vehicle that may be removed and replaced with other modules or systems (i.e. the rear section is an interchangeable module). Military vehicle 10 includes a center driver configuration where the driver is located behind a front axle of the vehicle and along a center axis (e.g., longitudinal centerline) of the chassis. In some embodiments, each passenger (e.g., the left front passenger, the right front passenger, etc.) is positioned offset from the longitudinal centerline and behind (i.e. offset along the longitudinal centerline from) the center driver location to improve the visibility of the driver. As shown in FIGS. 1-21, the military vehicle 10 also includes a windshield assembly that includes angled side windshields. The windshield assembly provides a plurality of driver sight lines out from the cab. According to an exemplary embodiment, military vehicle 10 includes additional storage that is formed into the body panels of the vehicle.

Figure 1:
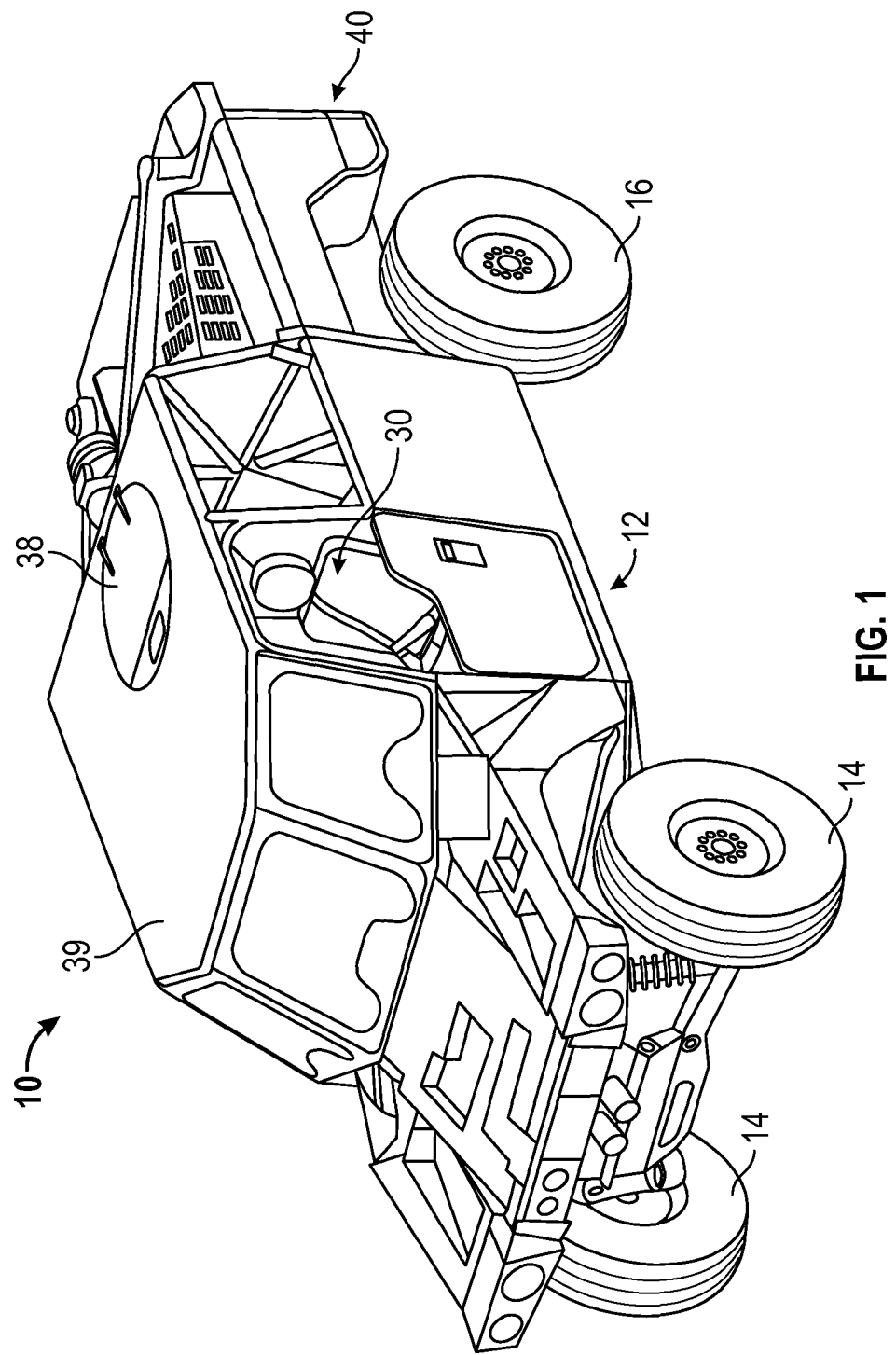
FIG. 1 is an elevation view of a military vehicle, according to an exemplary embodiment.

Referring now to FIG. 1, the military vehicle 10 includes a body 12 (e.g., cab, cabin, housing, capsule, etc.) coupled to a chassis and having a passenger or occupant compartment 30. According to an exemplary embodiment, the military vehicle 10 includes a removable portion, shown as rear module 40. As shown in FIG. 1, the military vehicle 10 includes front wheels 14 and rear wheels 16. According to an exemplary embodiment, the body 12 includes a roof 39 having a hatch (e.g., gunner hole, turret opening, opening, etc.) that is closed by a cover 38. According to an exemplary embodiment, the roof 39 is a removably attached cover that is coupled to cab 12 (e.g., with snaps, a zipper, etc.). According to an alternative embodiment, roof 39 is a fixed cover.

Figure 2:
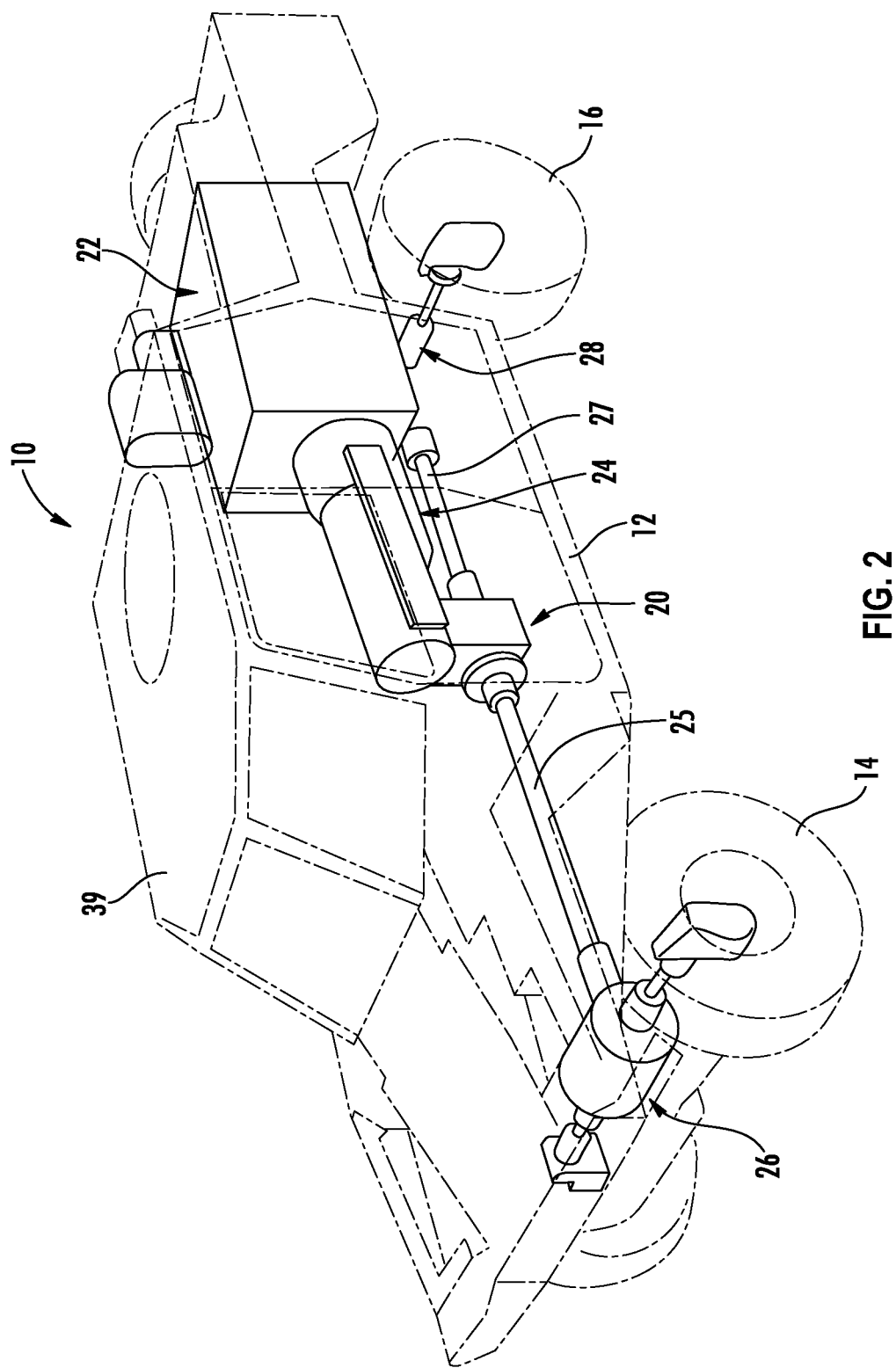
FIG. 2 is a schematic view of a military vehicle, according to an exemplary embodiment.

According to the exemplary embodiment shown in FIG. 2, the military vehicle 10 also includes a prime mover (e.g., diesel engine, gasoline engine, electric motor, etc.), shown as an engine 22, powering a drive train 20. The drive train 20 includes a transmission 24, a front driveshaft 25, a rear driveshaft 27, a front axle assembly 26, a rear axle assembly 28, and various other components. As shown in FIG. 2, the engine 22 is located in the rear of the vehicle (i.e. a rear engine configuration), allowing the weight of the vehicle to be more evenly balanced over the rear axle of the military vehicle 10.

Figure 3A:
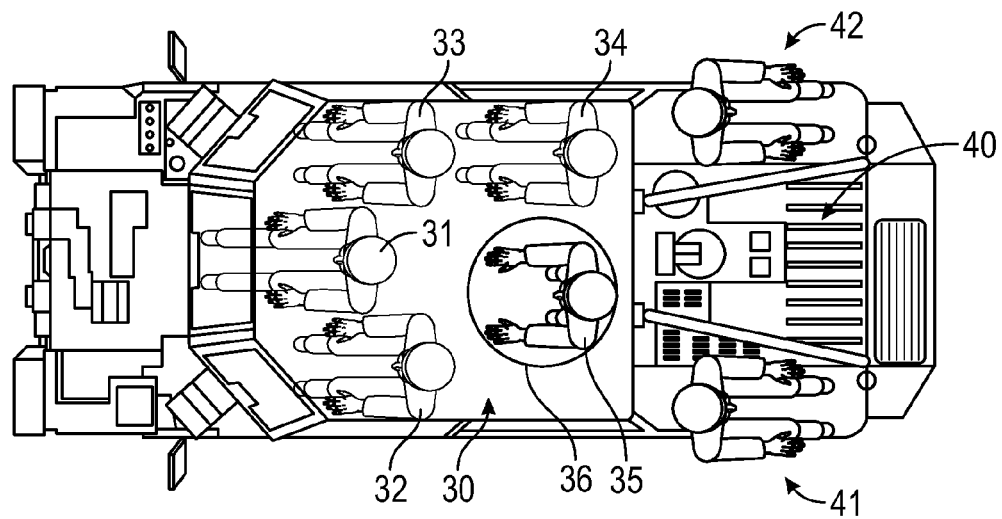
FIGS. 3A-3B are elevation views of a seating arrangement for a military vehicle, according to an exemplary embodiment.
Figure 3B:
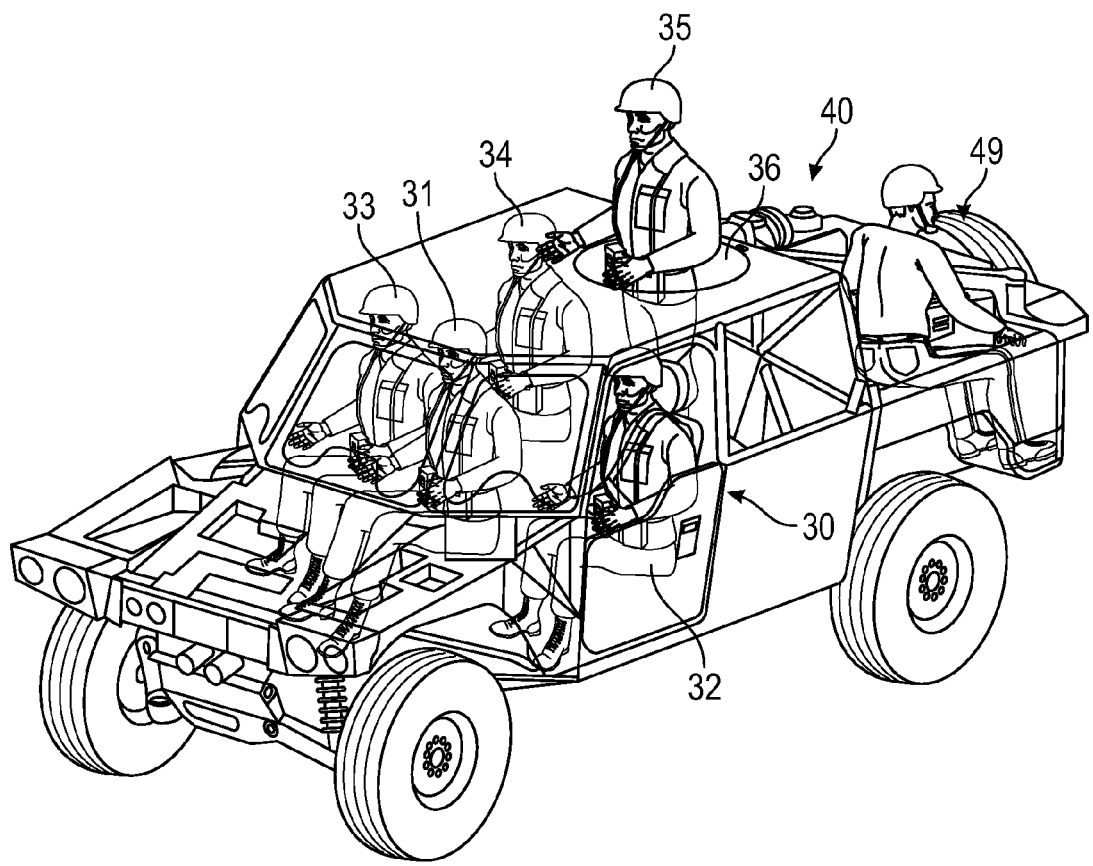

Referring next to FIGS. 3A-3B, the passenger compartment 30 includes seating for a center driver 31, a left front passenger 32, a right front passenger 33, a right rear passenger 34, and a left rear passenger 35. As shown in FIGS. 3A and 3B, the center driver 31, the left front passenger 32, the right front passenger 33, the right rear passenger 34, and the left rear passenger 35 are all positioned within the passenger compartment 30 of the cab 12 (i.e. the driver position 31 is not within a separate compartment apart from the passengers). According to an exemplary embodiment, the left rear passenger 35 seating position may be aligned with an opening 36 (e.g., as a gunner to operate a turret). Military vehicle 10 may also include secondary seating positions 41 and 42 located within the rear module 40 of the military vehicle 10.

As shown in FIG. 3B, the driver position 31 is located along a center axis of the passenger compartment 30. According to an exemplary embodiment, the center driver position 31 is located in front of (i.e. offset from along the center axis, positioned closer to the front of the cab, positioned closer to the front axle, etc.) the left front passenger position 32 and the right front passenger position 33. This position allows the driver to have greater visibility while driving the military vehicle 10. According to an exemplary embodiment, military vehicle 10 provides a field of view extending 270 degrees around the driver. Locating the center driver position 31 within the passenger compartment 30 of the cab 12 facilitates communication between the driver and the passengers of the vehicle that are also within the compartment 30. Also as shown in FIGS. 3A-3B, the center driver position 31 is located behind a front axle of the vehicle, allowing for a more comfortable ride for the driver.

Figure 4:
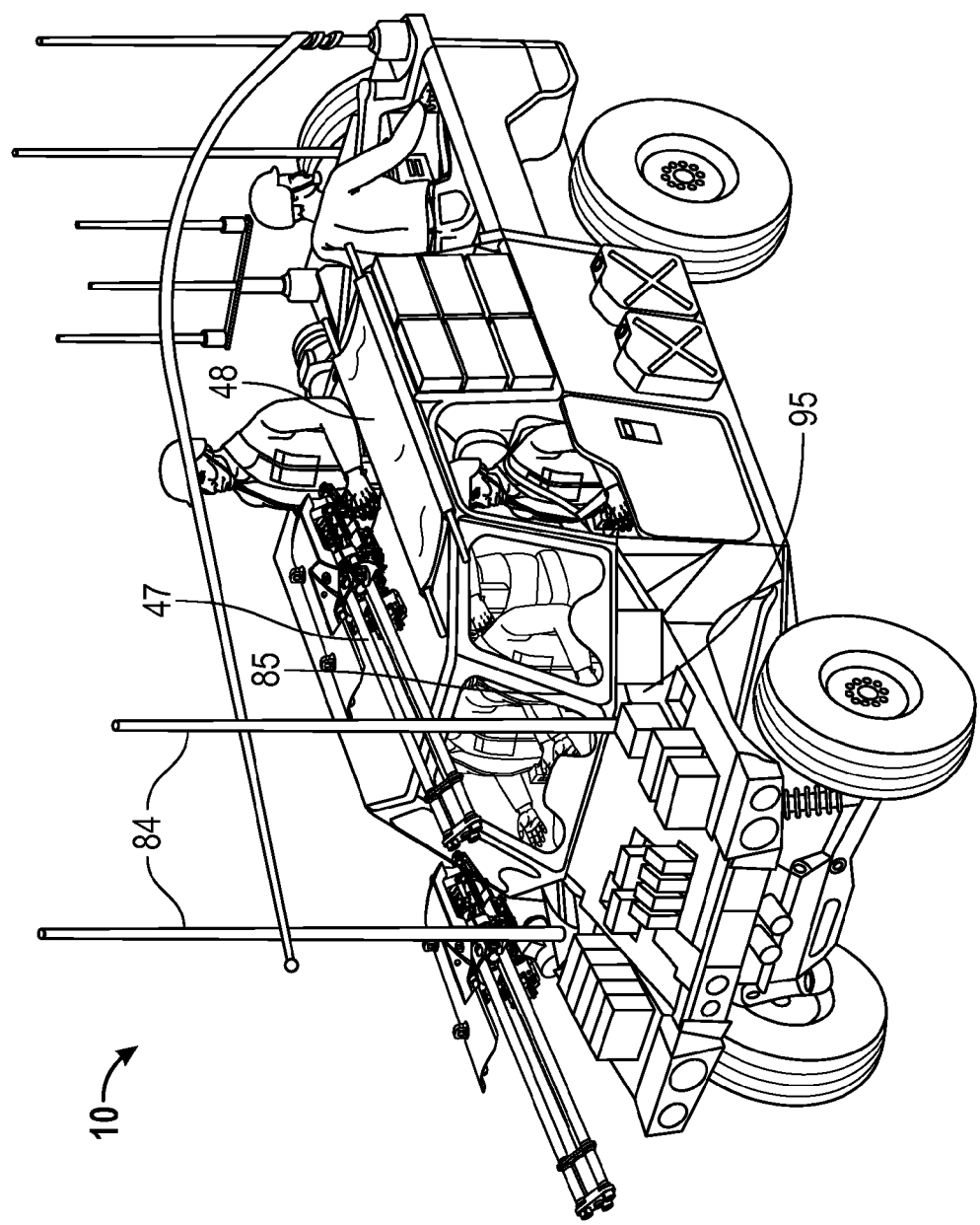
FIG. 4 is an elevation view of a military vehicle having supplemental components, according to an exemplary embodiment.

Referring now to the exemplary embodiment shown in FIG. 4, the military vehicle 10 includes a communication kit. As shown in FIG. 4, the military vehicle 10 includes antennas 84 that are coupled to the front portion of the vehicle with a mounting interface 95. According to an exemplary embodiment, the mounting interface 95 positions the antennas 84 in alignment with the A-pillars 85 of the military vehicle 10 to reduce the visual impact of the antennas 84 on a driver's field of view. As shown in FIG. 4, the antennas 84 are configured to reside in substantially the same plane as the A-pillars 85 (i.e. with more than half of antennas 84 hidden) and aligned with the A-pillars 85 along a driver sight line. Such an arrangement improves the driver's visibility through the windshields of the military vehicle 10.

Figure 5:
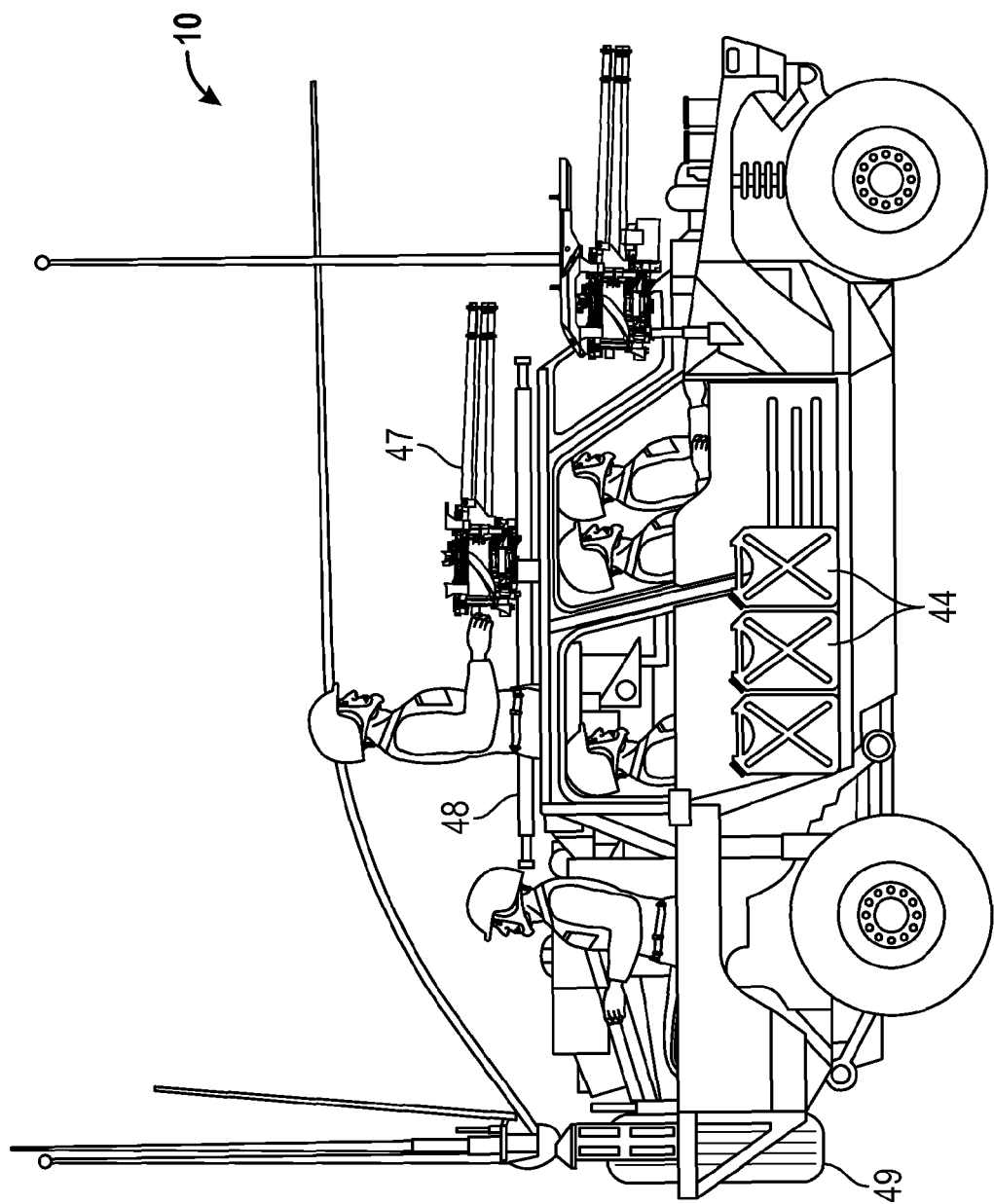
FIG. 5 is an elevation view of a military vehicle having supplemental storage systems, according to an exemplary embodiment.
Figure 6:
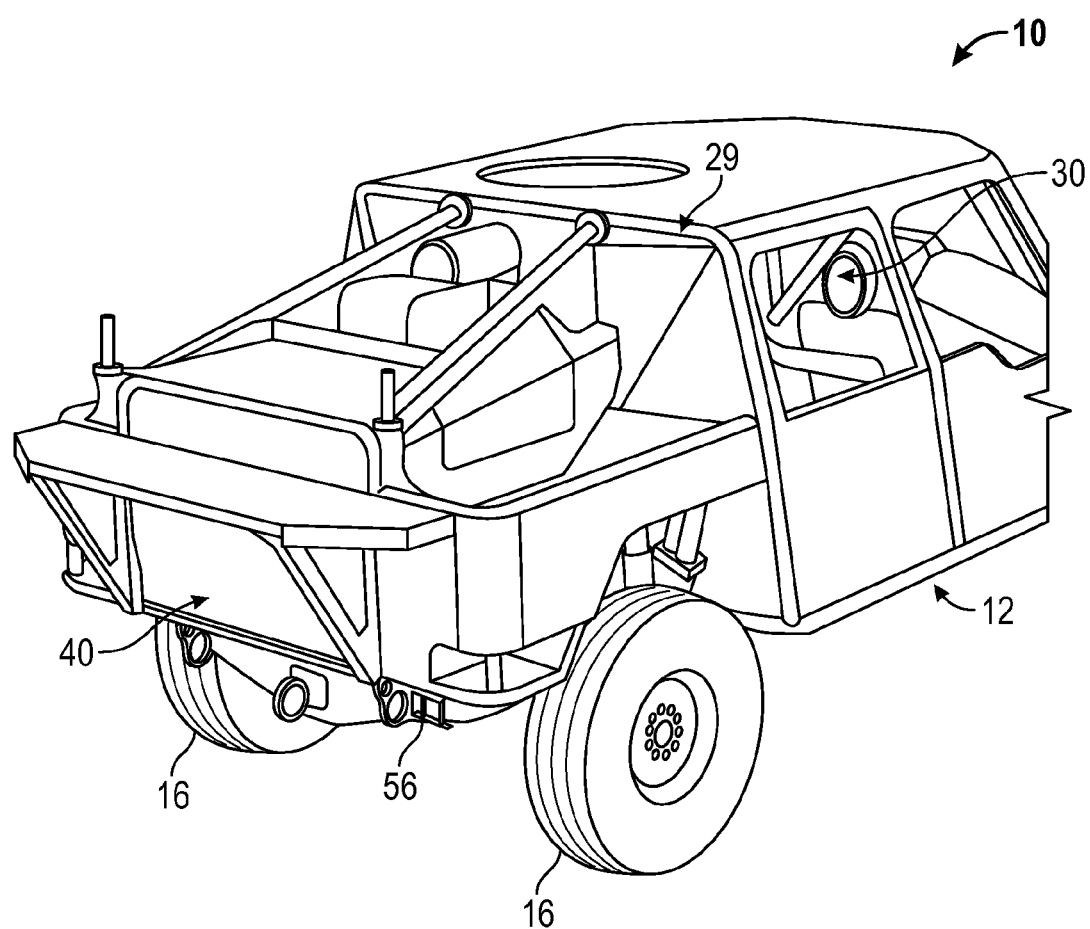
FIGS. 6-8 are elevation views of a military vehicle having a removable rear module that provides supplemental seating, according to an exemplary embodiment.

Referring now to the exemplary embodiment shown in FIG. 5, the military vehicle 10 includes storage compartments for various cans or containers (e.g., gas cans, water cans, ammunition cans, etc.). As shown in FIG. 5, the military vehicle 10 includes storage containers 44 on each side of the vehicle and a spare tire 49 located on a rear of the vehicle. According to an exemplary embodiment, the military vehicle 10 also includes a stretcher 48 that is mounted to the top of the vehicle. The military vehicle 10 may also include a weapon 47 that is operable by the passenger in the passenger position 35 (e.g., the gunner position).

Figure 7:
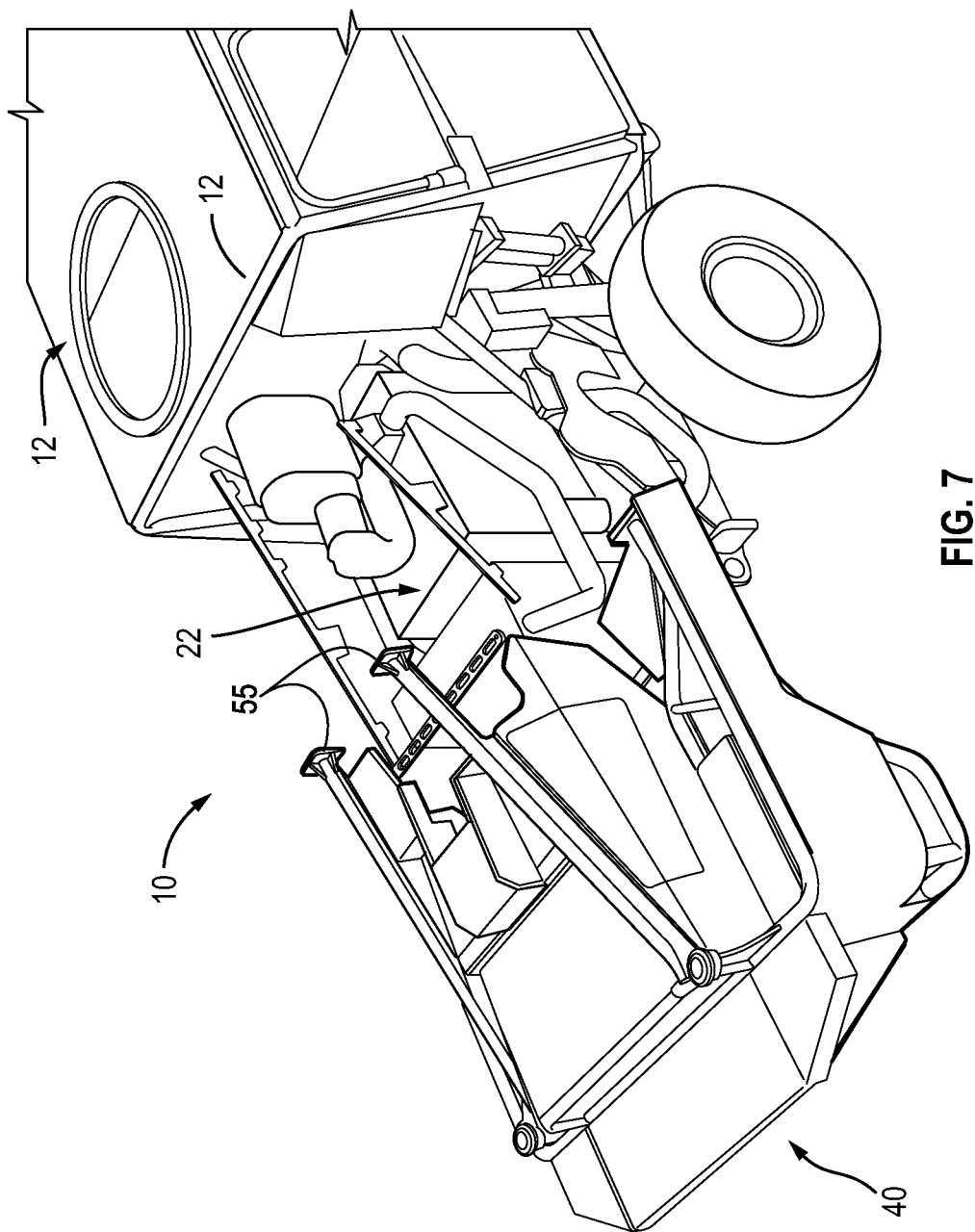
Figure 8:
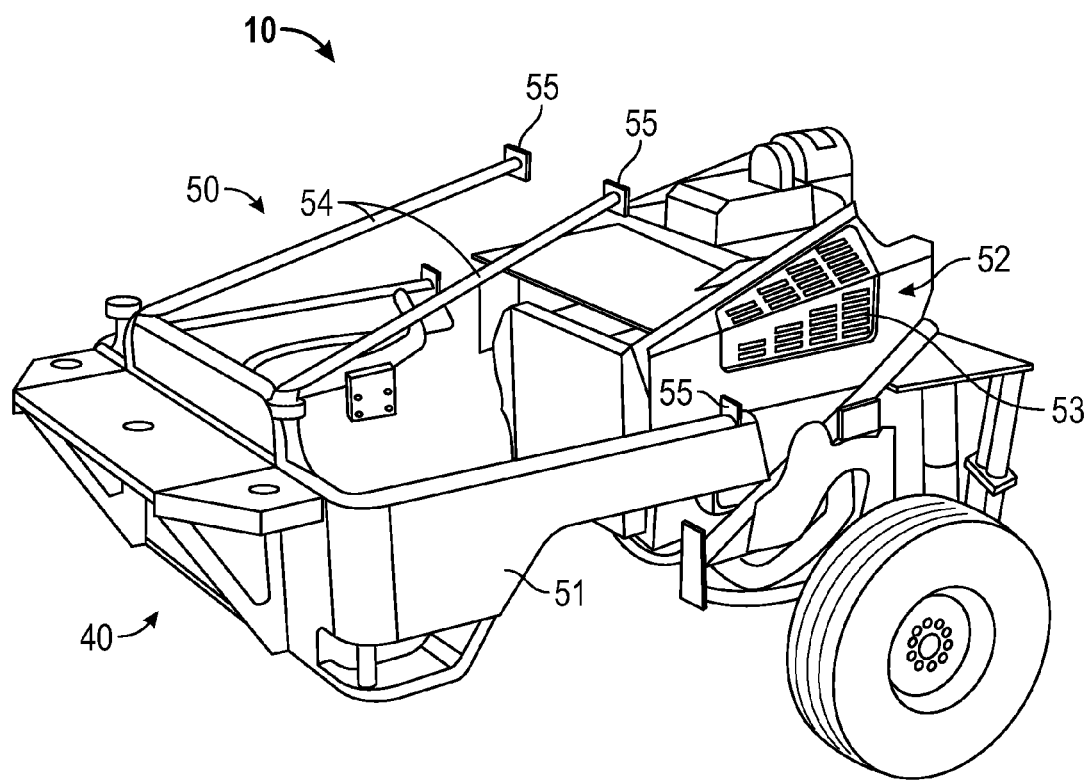
Figure 9:
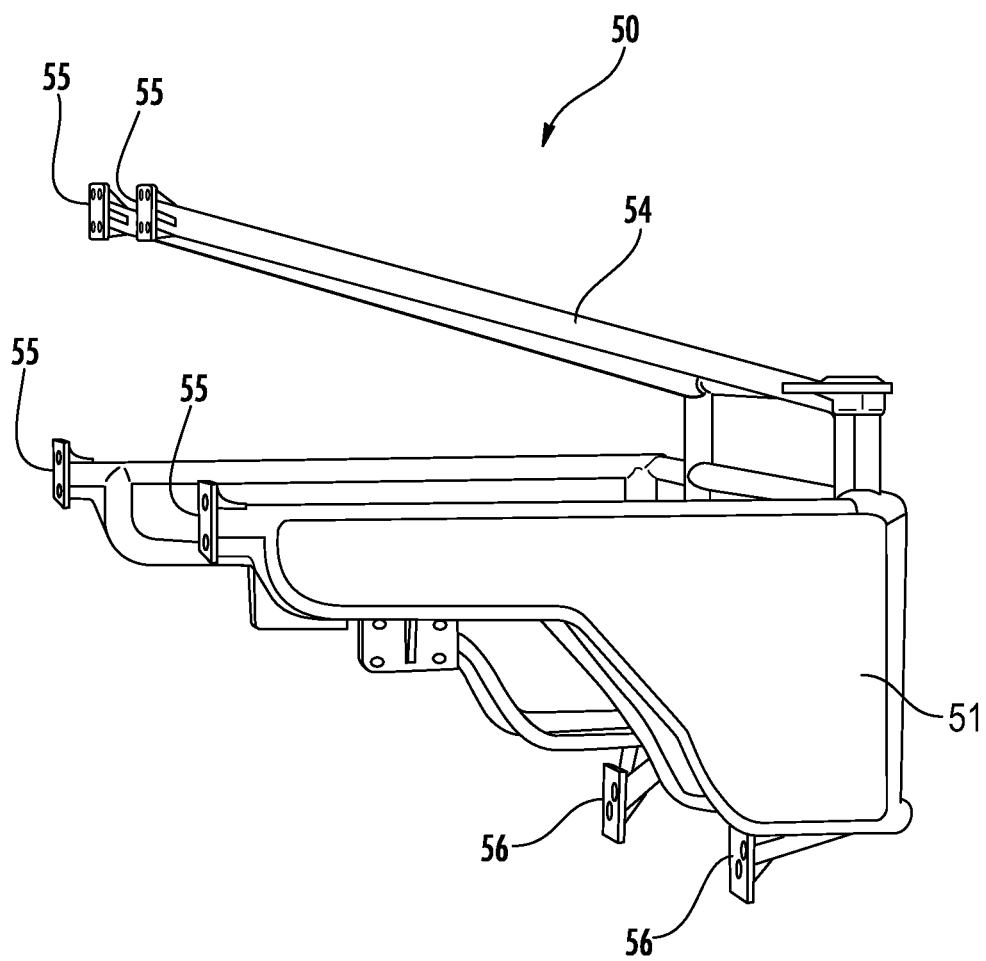
FIG. 9 is an elevation view of a removable rear module that provides supplemental seating, according to an exemplary embodiment.

Referring next to the exemplary embodiment shown in FIGS. 6-9, the military vehicle 10 includes a rear module 40 partially surrounding the rear axle. According to an exemplary embodiment, rear module 40 is removably attached to frame 29 of the cab 12. As shown in FIGS. 7-8, rear module 40 may be removed from the cab 12 to allow access to the engine 22. According to the exemplary embodiment shown in FIGS. 6-9, the rear module 40 includes a frame 50 having tubular members fastened (e.g., welded, bolted, etc.) together. The frame 50 includes tubular members 54 having connection flanges 55 which interface with complimentary flanges on the frame 29 of the cab 12. According to an exemplary embodiment, the rear module 40 has four such connection flanges 55. As shown in FIG. 9, the frame 50 also includes two connection flanges 56 that interface with complimentary flanges on the frame 29 of the cab 12. Efficient removal of the rear module 40 from the military vehicle 10 may be accomplished by interacting with only six interfaces (connection flanges 55 and connection flanges 56). According to an exemplary embodiment, an operator need only disconnect these interfaces to remove rear module 40 from the frame 29 of cab 12. It should be understood that connection flanges 55 and connection flanges 56 are designed to facilitate removal of the rear module 40. As shown in FIGS. 6-9, connection flanges 55 and connection flanges 56 are open to an operator (i.e. exposed, visible, accessible) to facilitate efficient removal.

In some embodiments, the rear module 40 also includes a shroud 52 that partially covers the engine 22. As shown in FIG. 8, the shroud 52 includes panels 53 that allow access to the engine for service and maintenance. According to an exemplary embodiment, the shroud 52 is part of the rear module 40 and is disconnected from military vehicle 10 with rear module 40. According to an alternative embodiment, the shroud 52 may be coupled to the engine or frame 29 of the military vehicle 10 and remain in place when the rear module 40 is disconnected from the military vehicle 10.

As shown in FIGS. 3A and 6-9, the rear module 40 includes a left secondary passenger position and a right secondary passenger position. The left secondary passenger position and the right secondary passenger position are formed by a lateral body panel that provides a seat for the passenger. The left secondary passenger position and the right secondary passenger position may also be formed by an angled body panel coupled to the lateral body panel. These components may also partially cover the wheels (i.e. and serve as a fender). As shown in FIGS. 8-9, various body panels 51 are coupled to the frame 50 to partially surround the left secondary passenger position and the right secondary passenger position. The body panels 51 may provide structural rigidity to the rear module 40 and also partially protect a passenger positioned on the rear module 40.

Figure 10:
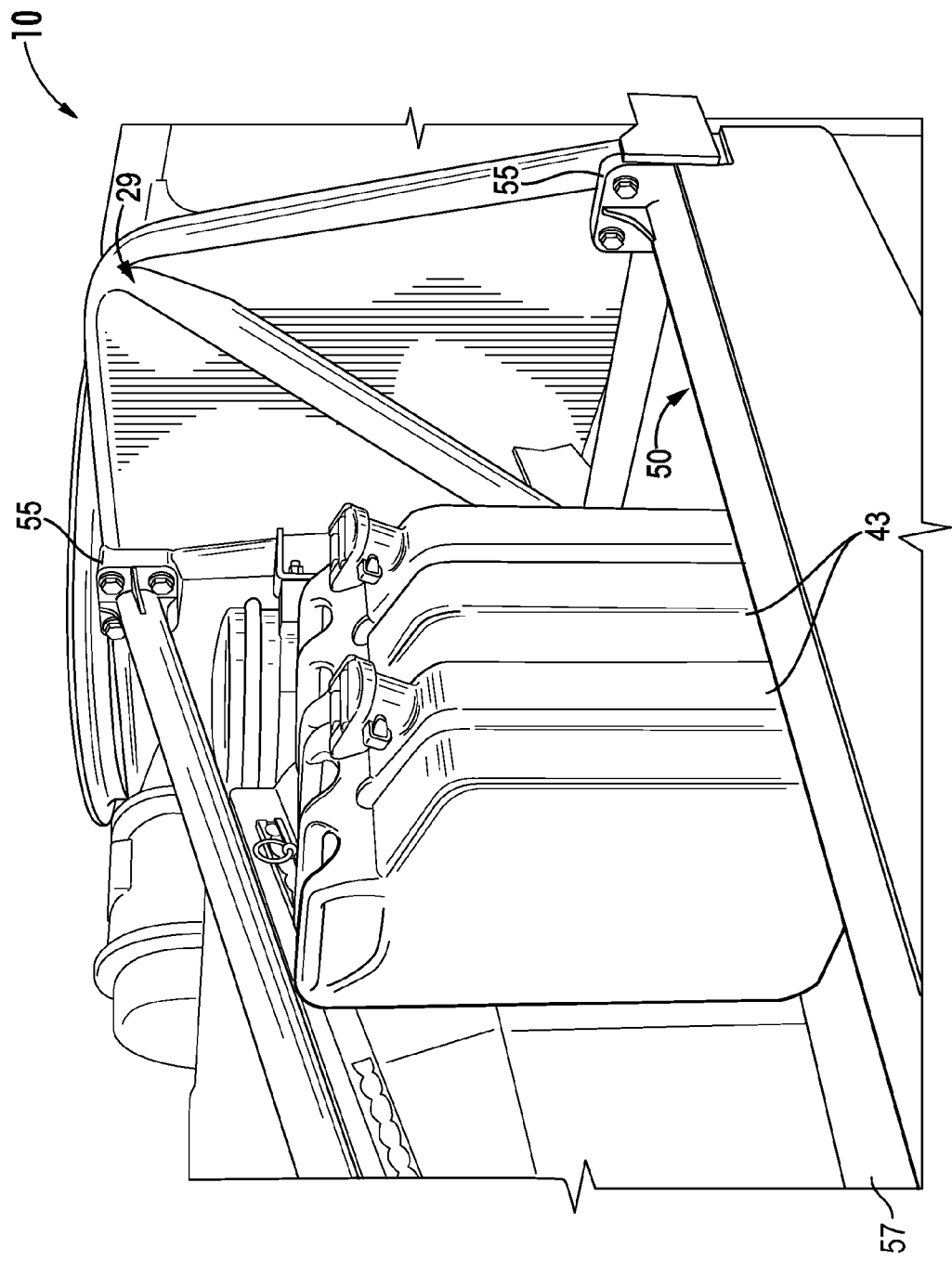
FIG. 10 is an elevation view of a military vehicle having a removable rear module that provides additional storage, according to an exemplary embodiment.
Figure 11:
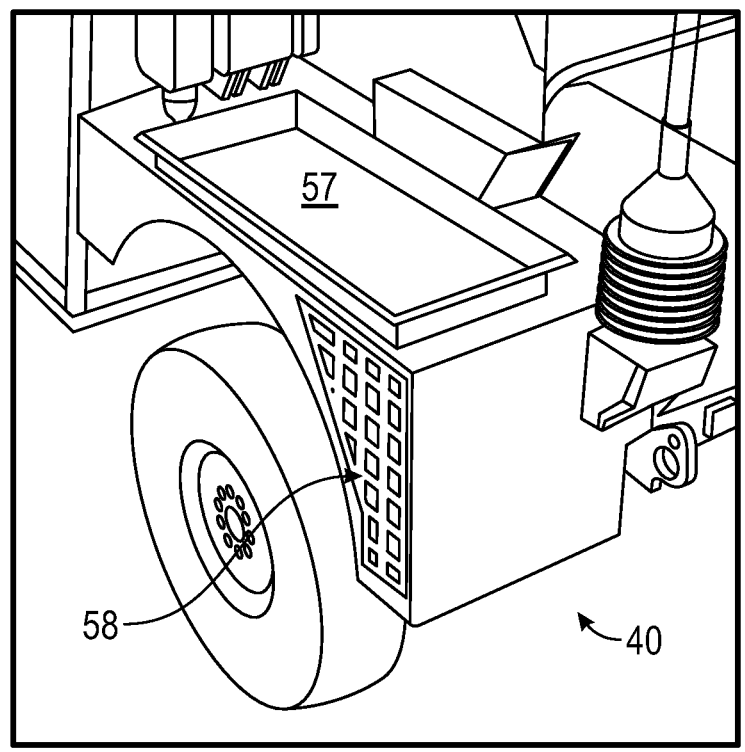
FIG. 11 is an elevation view of a military vehicle having a removable rear module that provides additional storage, according to an alternative embodiment.

Referring next to the embodiments shown in FIGS. 10-11, the rear module may include a body panel 57 to provide additional storage. As shown in FIG. 10, various canisters, shown as cans 43, may be used to store food, fuel, water, or still other materials on the body panel 57 of the rear module 40. In still other embodiments, the rear module includes interfaces that engage still other objects (e.g., a shovel). As shown in FIG. 11, the rear module 40 includes a body panel 57 and a storage volume 58 that both provide additional storage. According to an exemplary embodiment, the rear module 40 extends around a rear portion of the cab of the vehicle (e.g., partially covers both rear tires). According to the embodiment shown in FIG. 11, the rear module 40 is positioned on only a single lateral side of the vehicle. The vehicle may include a plurality of such rear modules 40 (e.g., one positioned over each rear tire, etc.). While the figures show various potential embodiments, it should be understood that rear module 40 may have still other different configurations.

According to an exemplary embodiment, removal of rear module 40 allows for the introduction (i.e. attachment) other rear modules. For example, a rear module may be coupled to the cab 12 allowing the military vehicle 10 to have a different configuration. Such interchangeability of rear modules allows for greater flexibility and variation in use of the military vehicle 10. Additionally, having open interface points for the rear module allows for easy interchangeability (e.g., while the vehicle is in active deployment).

Referring now to FIGS. 12-17, various embodiments of a front portion of the military vehicle 10 are shown. According to an exemplary embodiment, the front of the military vehicle 10 includes a body panel assembly 60 that includes a right body panel section 61, a center body panel section 62, and a left body panel section 63. According to an exemplary embodiment, the right body panel section 61, the center body panel section 62, and the left body panel section 63 are fastened (e.g., bolted, welded, etc.) together. According to an alternative embodiment, the right body panel section 61, the center body panel section 62, and the left body panel section 63 are integrally formed as a single unitary component (e.g., molded, stamped, etc.).

Figure 12:
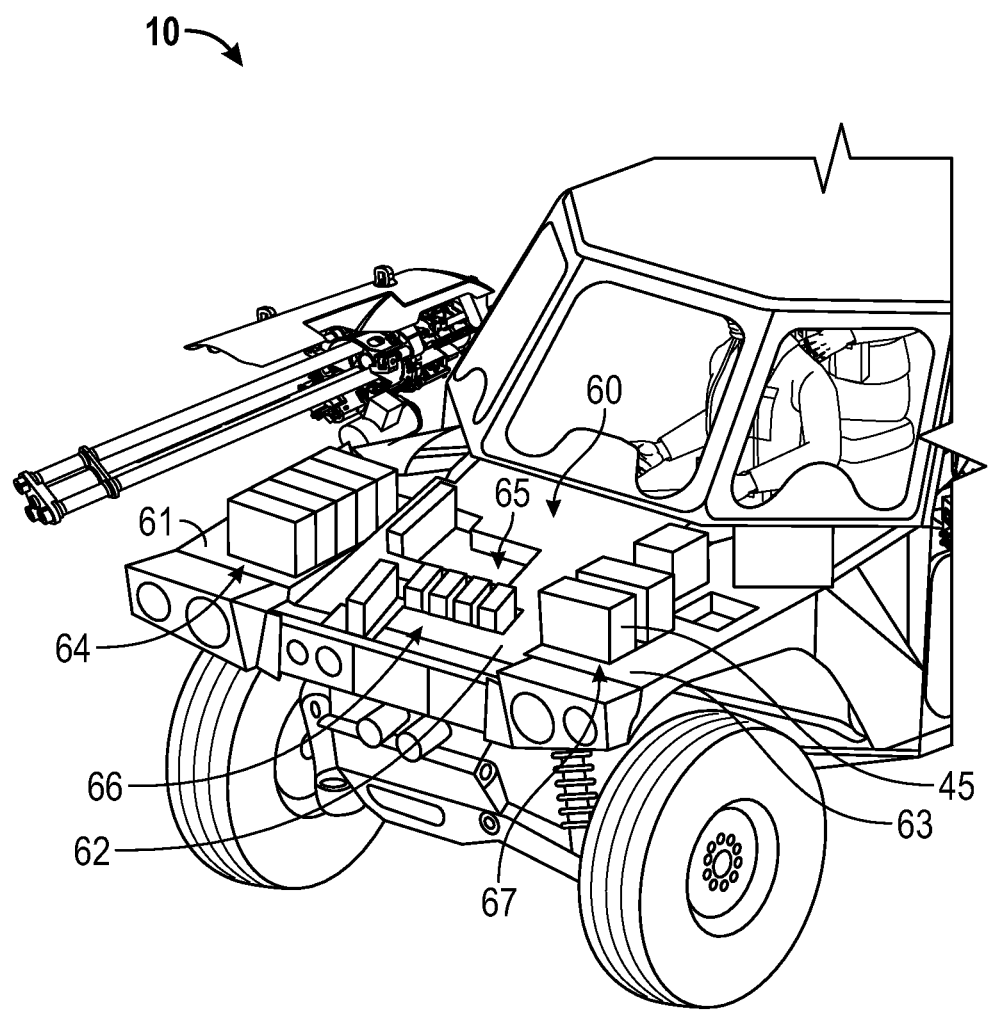
FIGS. 12-16 are elevation views of a military vehicle having a front body assembly that provides supplemental storage, according to an exemplary embodiment.
Figure 13:
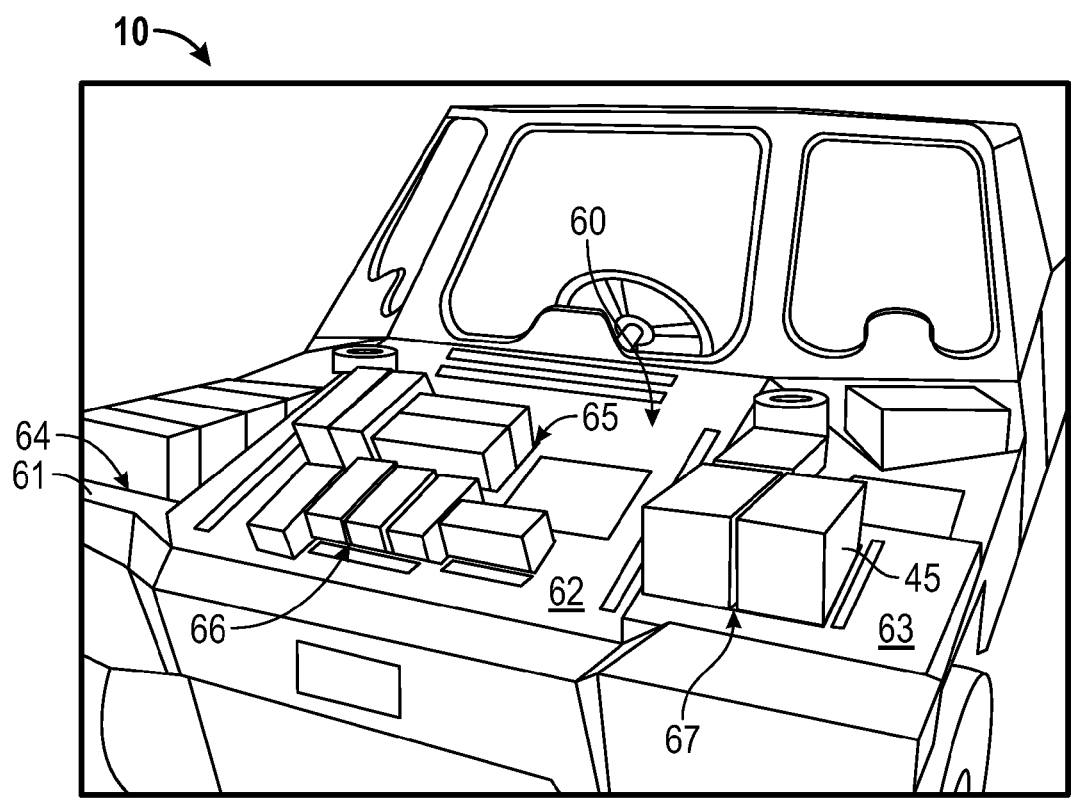
Figure 14:
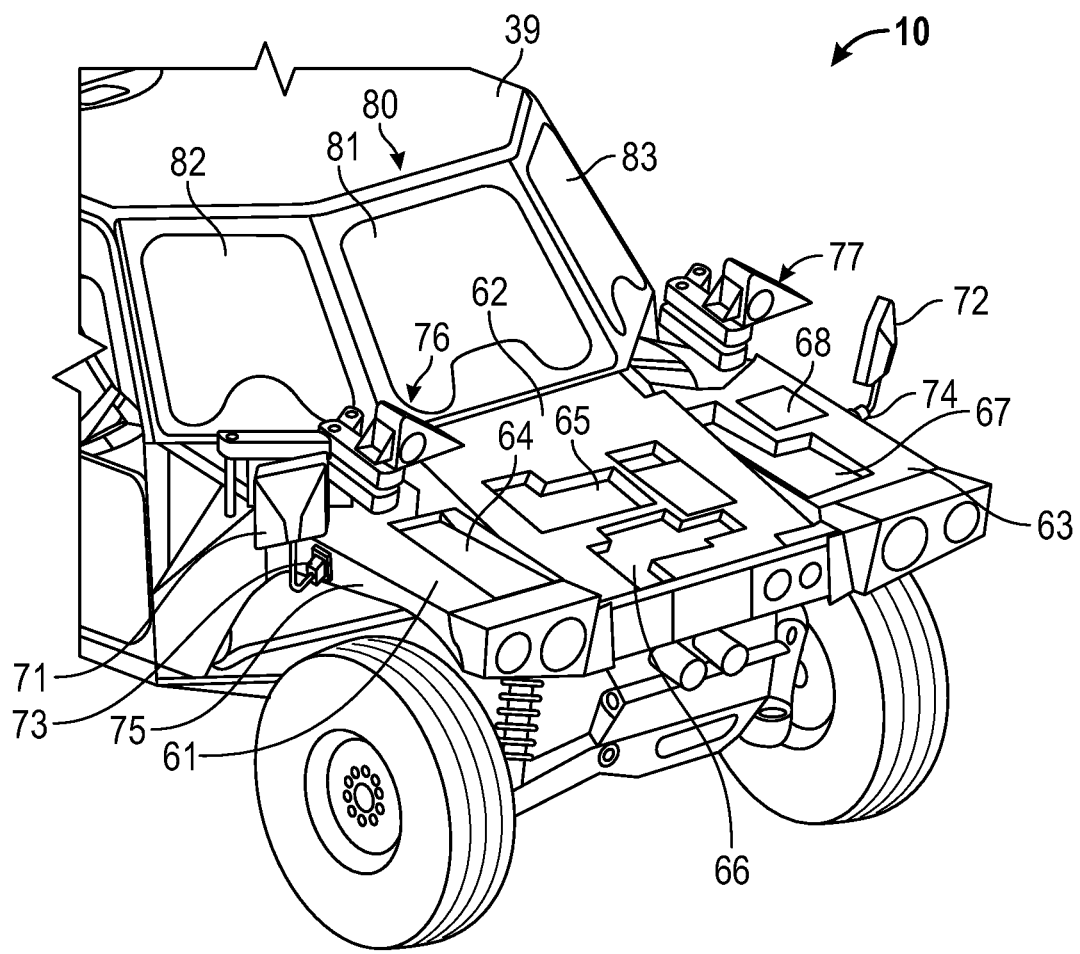

According to an exemplary embodiment, the right body panel section 61, the center body panel section 62, and the left body panel section 63 each include a depression (i.e. compartment) that is configured to partially receive a container 45 and provide additional storage for the vehicle. As shown in FIGS. 12-14, container 45 may have various shapes and sizes, and the corresponding depressions within the right body panel section 61, the center body panel section 62, and the left body panel section 63 may have various corresponding shapes. According to an exemplary embodiment, the right body panel section 61 includes a depression 64, the center body panel section 62 includes a depression 65 and a depression 66, and the left body panel section 63 includes a depression 67 and a depression 68. According to the alternative embodiment shown in FIG. 16, the right body panel section 61, the center body panel section 62, and the left body panel section 63 may define still other depressions.

According to an exemplary embodiment, the depressions are integrally formed within an outer surface of the individual body panel sections. By way of example, the compartments may be molded or stamped during the construction of the individual body panel sections. According to an alternative embodiment, the depressions are separate components that are fastened (e.g., bolted, etc.) to the individual body panel sections. According to the alternative embodiment shown in FIG. 17, the depressions may be formed by a portion of the body panel sections themselves (i.e. a face of the depression may be formed by the body panel section). It should be understood that the depressions may be otherwise shaped or sized to suit different containers. According to still another alternative embodiment, a depression includes at least one moveable wall, the moveable wall allowing an operator to change the shape or size of the depression (e.g., to fit different containers).

Figure 16:
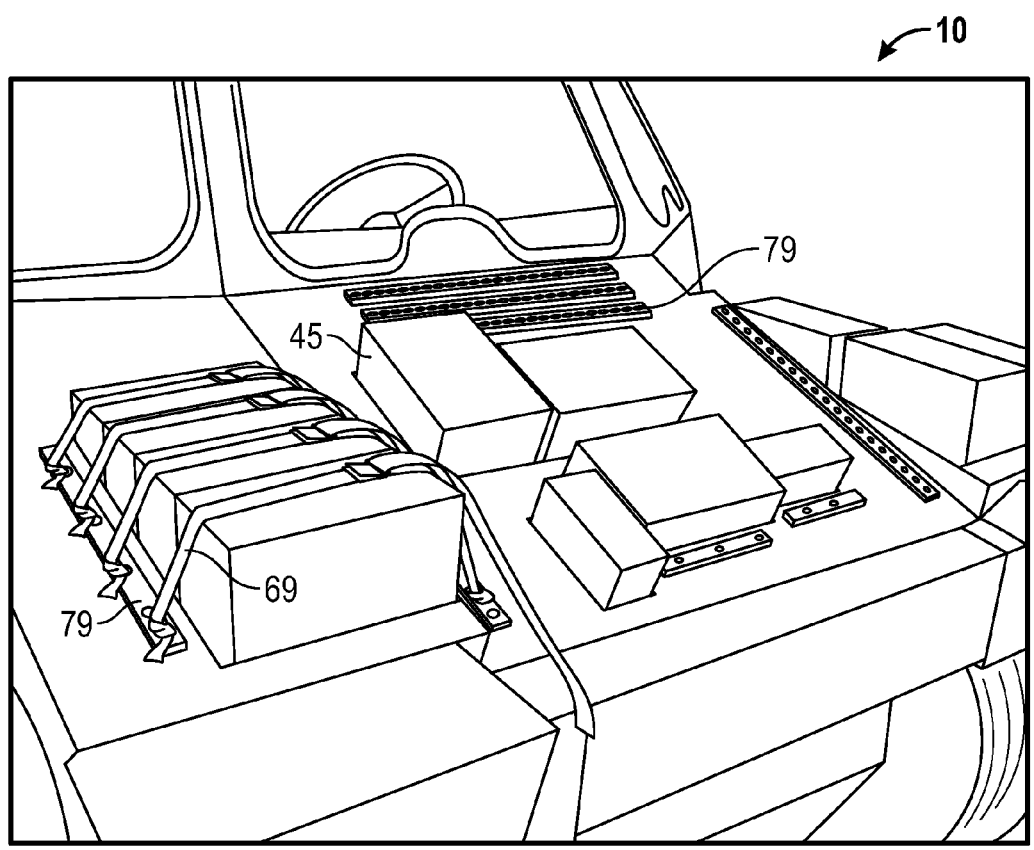

Referring to the exemplary embodiment shown in FIG. 16, the depressions are open (i.e. accessible, available, exposed) to the outside of the vehicle thereby reducing access time for an operator. Reducing access time may be important where an operator is a soldier operating in theater. As shown in FIG. 16, an operator need not open a door, hatch, or port to access the containers. Such open depressions also allow an operator to visually inspect the containers without needing to open one or more storage doors. According to an exemplary embodiment, the depressions reduce the likelihood that the containers may shift (e.g. move, fall off, etc.) during transportation. According to the exemplary embodiment shown in FIG. 16, fasteners (e.g., straps, etc.), shown as tie downs 69, further secure containers 45 within the depressions. As shown in FIG. 16, the tie downs 69 are coupled to the body panel assembly with a track 79 that is positioned along the depression. The tie downs 69 may be adjustable and allow for containers 45 having different sizes to be secured within the depressions.

Figure 15:
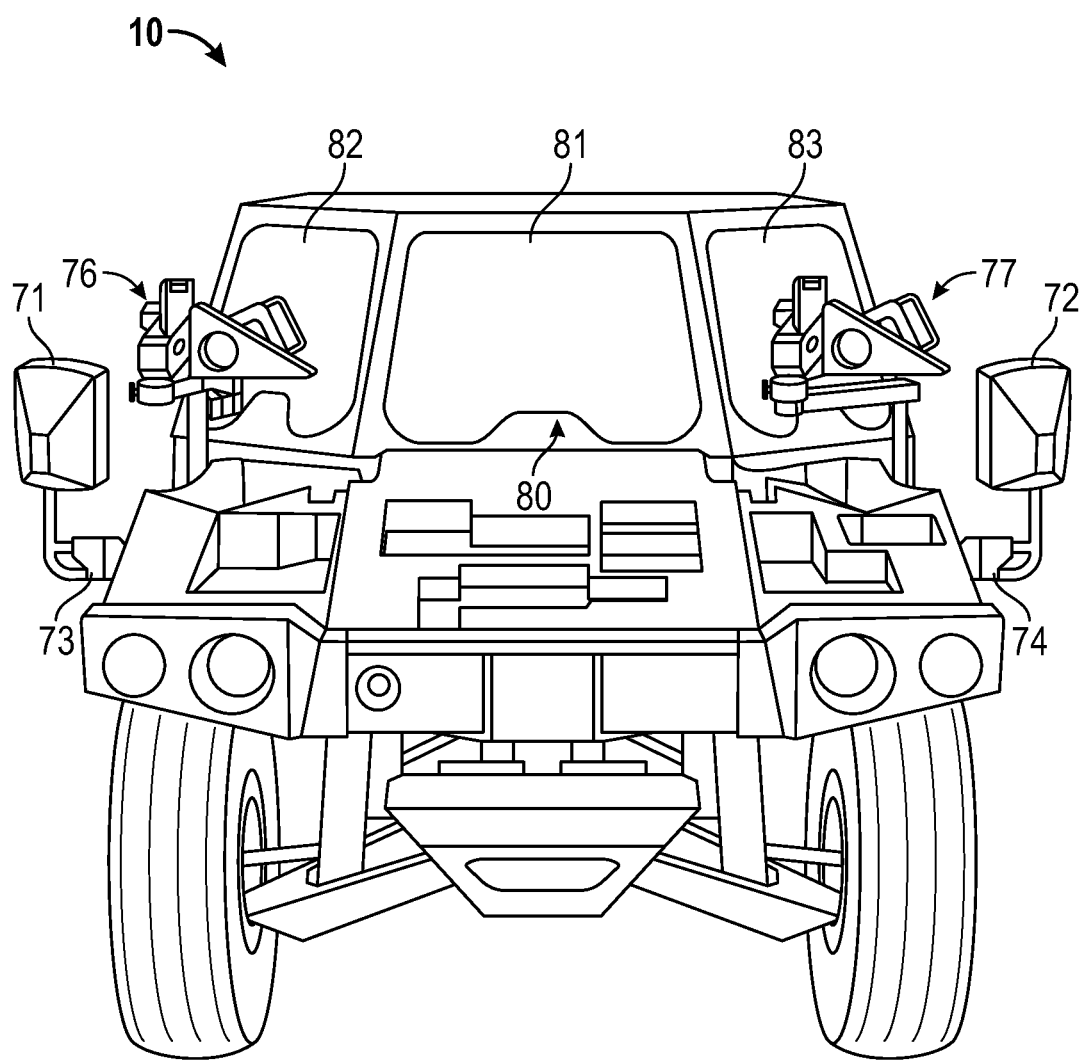
Figure 17:
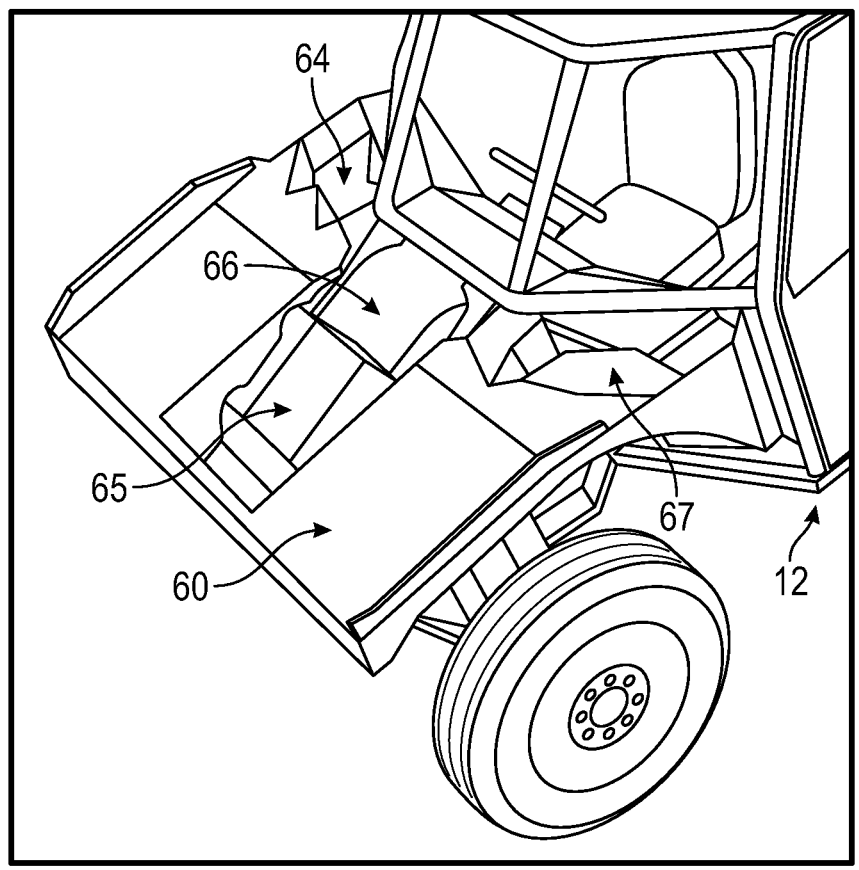
FIG. 17 is an elevation view of a military vehicle having a front body assembly that provides supplemental storage, according to an alternative embodiment.

Referring again to FIGS. 14-15, the military vehicle 10 includes a right front mirror 71 and a left front mirror 72 that are coupled to a front body portion 75 of the military vehicle 10. The right front mirror 71 includes a mounting flange 73, and the left front mirror 72 includes a mounting flange 74. According to an exemplary embodiment, mounting flange 73 and mounting flange 74 couple the mirrors to the front body portion 75. As shown in FIGS. 16-17, the military vehicle 10 includes a first gunsweep assembly 76 and a second gunsweep assembly 77 that are configured to support a weapon and associated ammunition for the weapon. As shown in FIGS. 14 and 15, the gunsweep assemblies are positioned to rotate freely (i.e. without interfering with the mirrors, windshield, or still other components). According to alternative embodiments, military vehicle 10 may include different mirror and gunsweep assembly positions.

Referring next to the exemplary embodiment shown in FIGS. 18-21, the military vehicle 10 includes a windshield assembly 80. As shown in FIGS. 18-21, windshield assembly 80 includes a center portion 81 positioned between a first side portion 82 and a second side portion 83. According to an exemplary embodiment, the windshield assembly 80 provides enhanced visibility to the centrally positioned driver of the military vehicle 10. The first portion 81 is positioned directly in front of the driver while the first side portion 82 and the second side portion 83 are positioned at a slight angle (e.g., less than 45 degrees) from the first portion 81. Such a configuration is intended to allow the driver to have full range of visibility from the center, left, and right portions of the windshield assembly 80.

Figure 19:
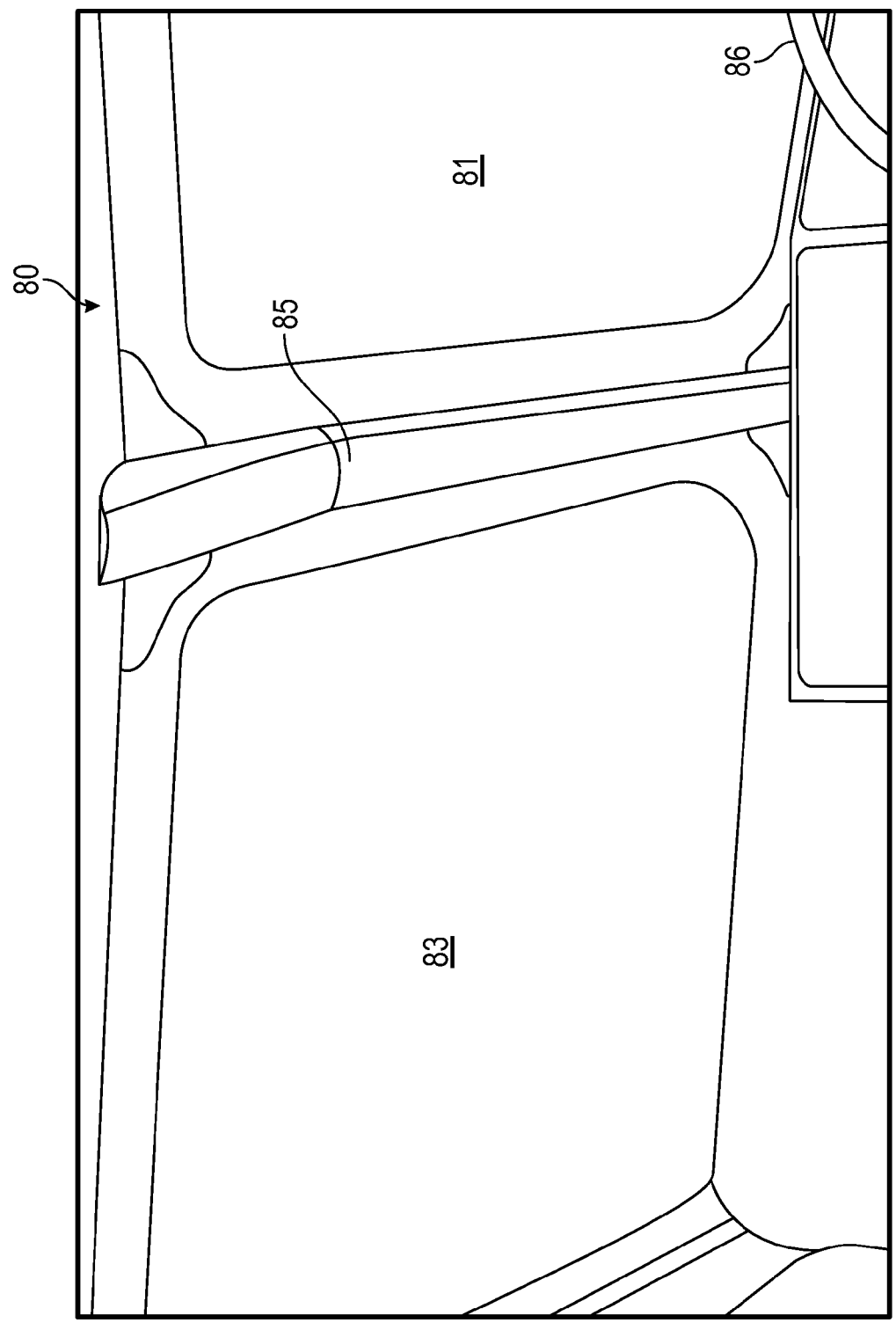
FIGS. 19-21 are elevation views of a windshield configuration for a military vehicle, according to an exemplary embodiment.
Figure 20:
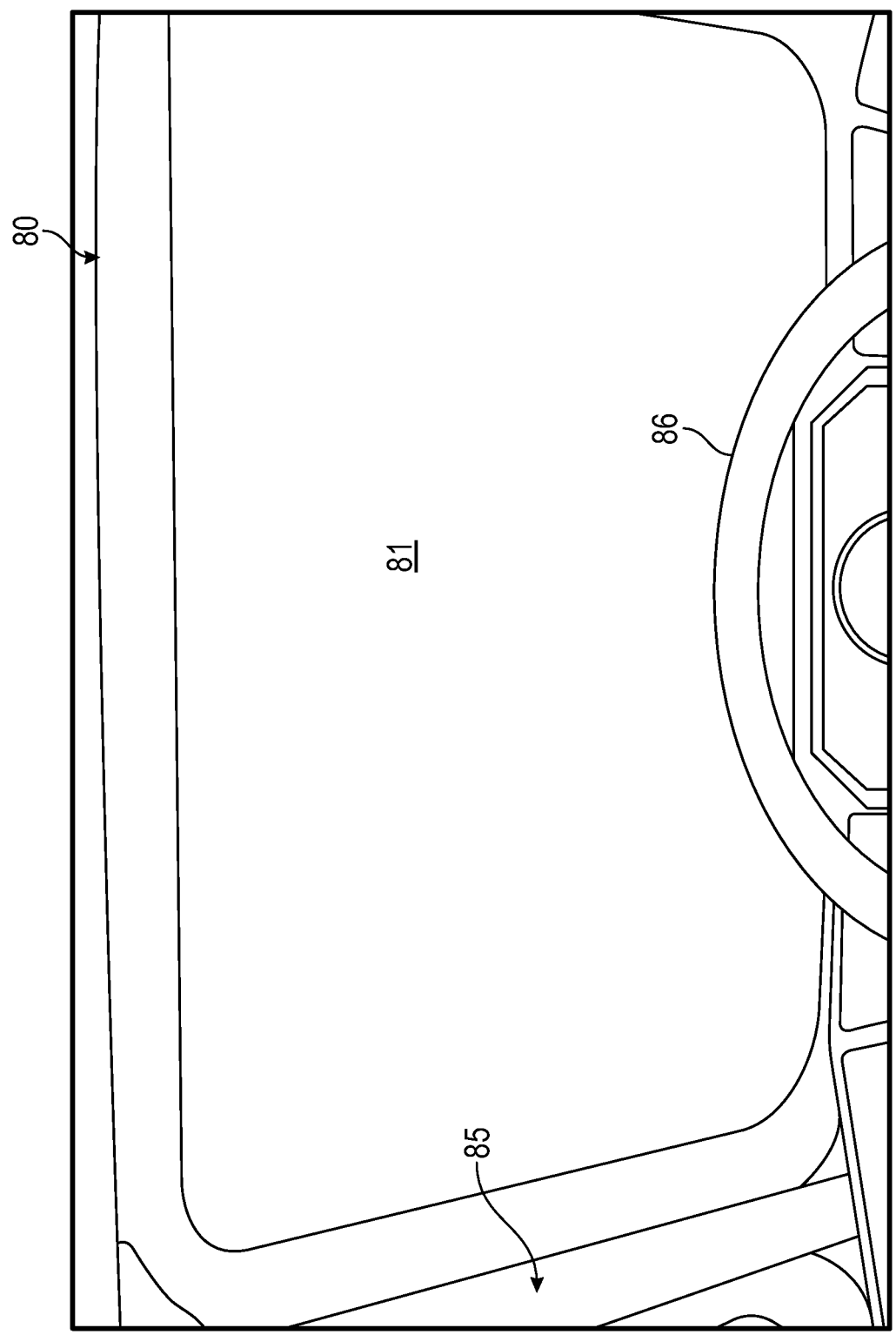
Figure 21:
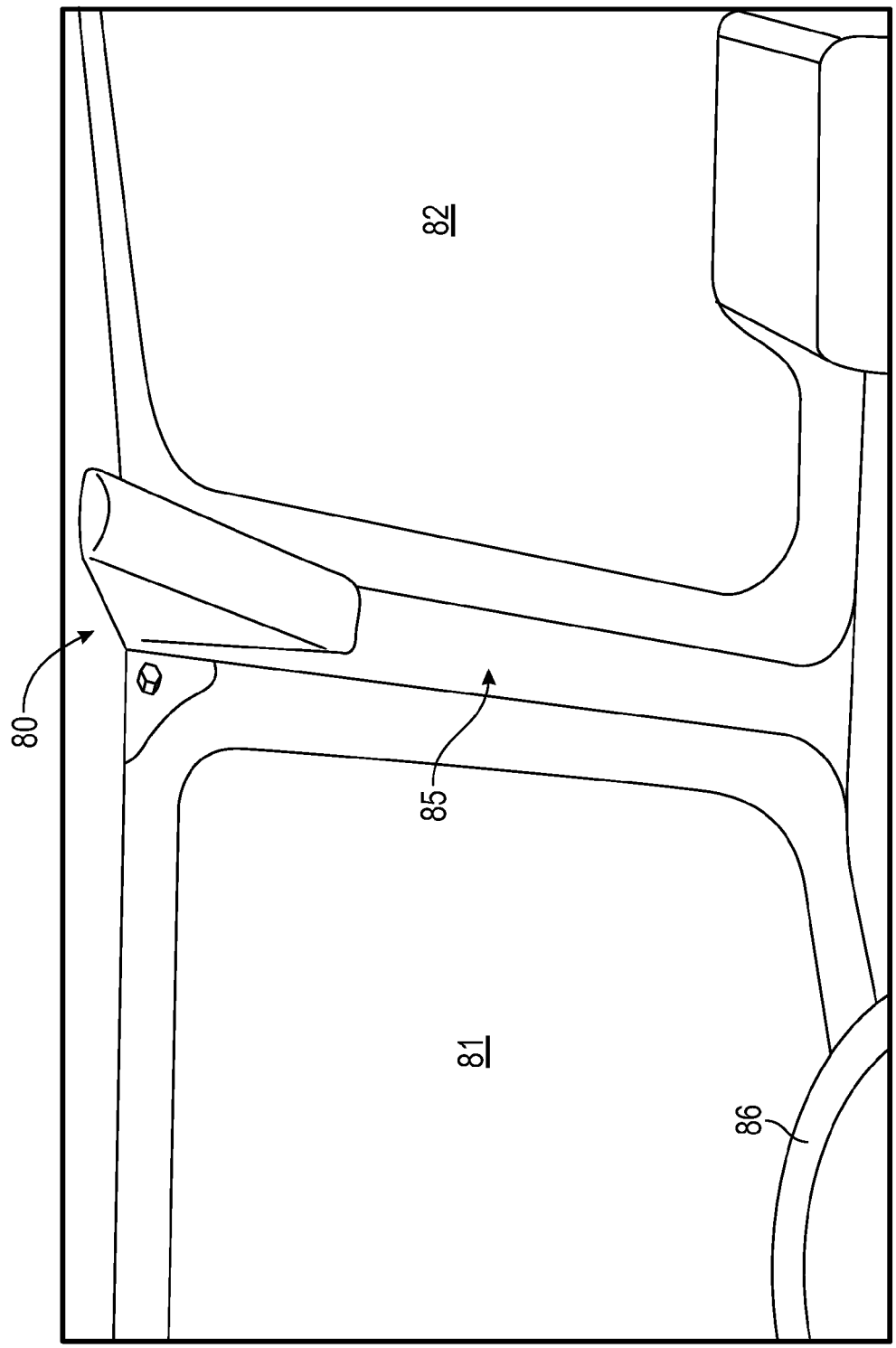

FIGS. 19-21 show a driver's view from a driver's seat through the windshield assembly 80, according to an exemplary embodiment. According to an exemplary embodiment, center portion 81 provides a clear view of the military vehicle 10 and the surrounding environment to the driver who is positioned behind a steering wheel 86. The lateral sides of center portion 81 are coupled to a pair of pillars, shown as A-pillars 85. FIG. 20 shows the driver's view along the travel direction, according to an exemplary embodiment. FIG. 19 shows the left hand view of a driver through the windshield assembly 80 and FIG. 21 shows the right hand view of the driver through the windshield assembly 80, according to an exemplary embodiment. According to an exemplary embodiment, a plurality of driver sight lines extend along the longitudinal centerline and laterally from the cab. The combination of longitudinal and lateral sight lines improves visibility for the driver. According to an exemplary embodiment, the position of the driver's seat and the windshield assembly 80 provides the driver with 270 degrees of visibility.

According to an exemplary embodiment, a first A-pillar 85 couples center portion 81 to first side portion 82 and a second A-pillar 85 couples center portion 81 to second side portion 83. In some embodiments, the antennas 84 are aligned with the A-pillar 85 along a driver sight line. Such a configuration reduces the visual impact of the antenna 84 on the driver's visibility through windshield assembly 80.

Figure 18:
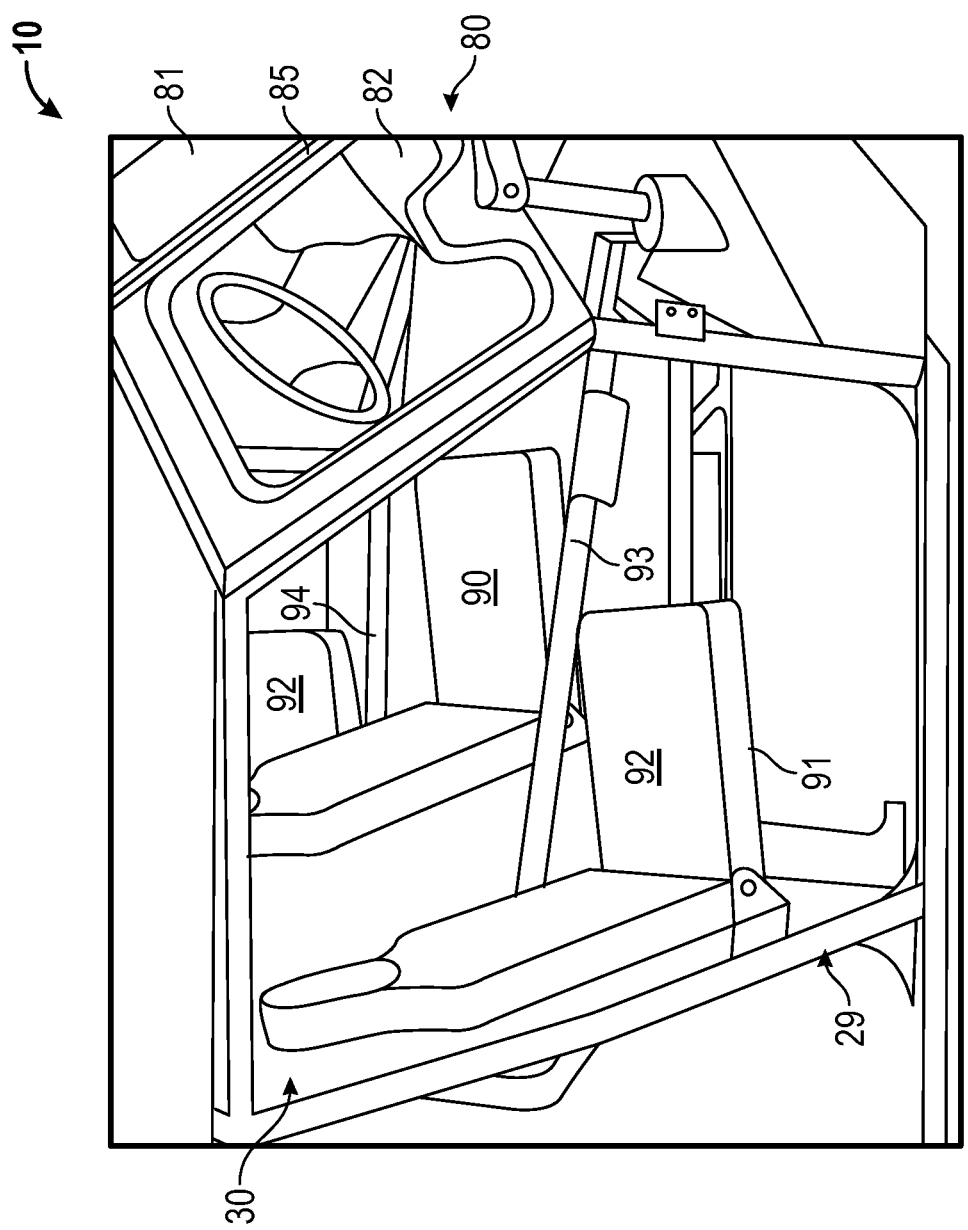
FIG. 18 is an elevation view of a cab assembly for a military vehicle including a centrally positioned driver's seat, according to an exemplary embodiment.

Referring again to the exemplary embodiment shown in FIG. 18, the driver's seat is positioned in front of passenger seat 91 and passenger seat 92. As shown in FIG. 18, passenger seat 91 and passenger seat 92 are located offset from (e.g., spaced apart from) the centerline of the vehicle. According to the exemplary embodiment shown in FIG. 18, the passenger seat 91 and the passenger seat 92 are moveable between a first position and a second position. According to an exemplary embodiment, the passenger seat 91 and the passenger seat 92 are folding seats with a lower portion (e.g., a seat portion) that rotates upwards to provide access and downward to provide a seat for an occupant. According to an exemplary embodiment, the moveable passenger seat facilitates ingress or egress of a driver. By way of example, a driver entering the passenger compartment 30 of the military vehicle 10 may fold up passenger seat 91 or passenger seat 92 to more easily access the driver's seat 90. The passenger seat 91 or the passenger seat 92 may be folded down for use by the left front and the right front passengers, respectively.

According to the exemplary embodiment shown in FIG. 18, the passenger compartment 30 of the military vehicle 10 includes a first support member, shown as tubular element 93, and a second support member, shown as tubular element 94. According to an exemplary embodiment, tubular element 93 and tubular element 94 are coupled to frame 29 and provide structural rigidity to military vehicle 10. As shown in FIG. 18, tubular element 93 and tubular element 94 are located on either side of the driver seat 90. The tubular element 93 and tubular element 94 facilitate access to passenger compartment 30. By way of example, the driver, the left front passenger, and the right front passenger do not need to traverse the tubular element 93 and tubular element 94 to access their respective seats. Such a position of tubular element 93 and tubular element 94 provide improved ingress and egress relative to traditional military vehicles having diagonal support members positioned on an exterior portion of the passenger compartment 30 (e.g., along the door opening).

It should be noted that references to "front," "rear," "top," and "base" in this description are merely used to identify various elements as are oriented in the figures with "front" and "rear" being relative to the environment in which the device is provided.

For the purpose of this disclosure, the term "coupled" means the joining of two members directly or indirectly to one another. Such joining may be stationary or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is important to note that the construction and arrangement of the various features as shown in the various exemplary embodiments is illustrative only. Although only a few embodiments have been described in detail in this disclosure, those skilled in the art who review this disclosure will readily appreciate that many modifications are possible (for example, variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes, and omissions may also be made in the design, operating conditions and arrangement of the various exemplary embodiments without departing from the scope of the present embodiments.

What is claimed is:

1. A vehicle, comprising:
   a chassis having a longitudinal centerline;
   a first axle and a second axle coupled to the chassis;
   a cab coupled to the chassis and including a windshield assembly comprising a first side portion, a middle portion, a second side portion, a first pillar coupling the first side portion to the middle portion, and a second pillar coupling the second side portion to the middle portion;
   a driver's seat disposed within the cab along the longitudinal centerline, wherein the windshield assembly and the driver's seat are positioned such that a driver's field of view includes a plurality of sight lines extending outward from the cab;
   an antenna coupled to a front portion of the chassis and positioned in spaced relation in front of the first pillar, wherein the antenna and the first pillar are positioned to reduce the visual impact of the antenna on the driver's field of view; and
   a passenger seat disposed within the cab, wherein the passenger seat is longitudinally offset from the driver's seat to improve driver visibility.

2. The vehicle of claim 1, wherein the antenna is coupled to the front portion of the chassis with a mounting interface, wherein the mounting interface is disposed longitudinally forward of the first pillar.

3. The vehicle of claim 2, wherein the antenna comprises an elongated shaft and protrudes in a vertical direction from the front portion of the chassis.

4. The vehicle of claim 3, further comprising a door movably coupled to the cab and selectively repositionable relative thereto independent of the windshield assembly.

5. The vehicle of claim 4, wherein the first pillar and the second pillar hold the first side portion, the middle portion, and the second side portion in position relative to the chassis, wherein the door is movable relative to the first side portion, the middle portion, and the second side portion.

6. The vehicle of claim 5, wherein the driver's field of view extends 270 degrees around the driver's seat.

7. The vehicle of claim 1, wherein the middle portion is positioned across the longitudinal centerline and the first side portion and the second side portion are positioned on opposing lateral sides of the longitudinal centerline.

8. The vehicle of claim 7, wherein the first side portion and the second side portion are angled relative to the middle portion such that the windshield assembly partially surrounds the driver's seat.

9. The vehicle of claim 1, wherein the passenger seat is moveable between a first position and a second position to facilitate driver access.

10. The vehicle of claim 9, wherein the passenger seat includes a folding bottom portion configured to support a passenger when in the first position and facilitate driver access when in the second position.

11. The vehicle of claim 1, further comprising a second passenger seat disposed within the cab between the driver's seat and the second axle and offset from the longitudinal centerline.

\* \* \* \* \*